United States Patent
Ko et al.

(10) Patent No.: US 7,958,272 B2
(45) Date of Patent: Jun. 7, 2011

(54) METHOD AND APPARATUS FOR OUTPUTTING A USER INTERFACE (UI) EVENT OF 3RD PARTY DEVICE IN HOME NETWORK

(75) Inventors: Young-goo Ko, Anyang-si (KR); Yoon-soo Kim, Suwon-si (KR); Sang-sun Choi, Suwon-si (KR); Jeong-ja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 11/528,615

(22) Filed: Sep. 28, 2006

(65) Prior Publication Data

US 2007/0089055 A1   Apr. 19, 2007

Related U.S. Application Data

(60) Provisional application No. 60/721,117, filed on Sep. 28, 2005.

(30) Foreign Application Priority Data

Jul. 19, 2006 (KR) .................. 10-2006-0067635

(51) Int. Cl.
*G06F 15/16* (2006.01)
*G01R 31/08* (2006.01)
(52) U.S. Cl. ........ 709/250; 709/219; 709/249; 370/238; 370/463
(58) Field of Classification Search .......... 709/219, 709/249; 370/238, 463
See application file for complete search history.

(56) References Cited

U.S. PATENT DOCUMENTS 6,138,154 A   10/2000   Karino
(Continued)

FOREIGN PATENT DOCUMENTS

KR   10-0406078 B1   11/2003

OTHER PUBLICATIONS

H. Song, D. Kim, K. Lee, J. Sung, "UPnP-Based Sensor Network Management Architecture", Proc. International Conference on Mobile Computing and Ubiquitous Networking. 2005 [retrieved from Internet 1.3.11 "http://kumo.ishilab.net/icmu2005/Papers/117390-1-050228235605.pdf"].*

(Continued)

*Primary Examiner* — Joseph Thomas
*Assistant Examiner* — Lashanya R Nash
(74) *Attorney, Agent, or Firm* — Sughrue Mion, PLLC

(57) ABSTRACT

Disclosed are a method and apparatus for outputting a user interface (UI) event of a 3rd party device in a home network having a server, a client and a control point, the server and the client joining a UI session by using a remote protocol, the control point controlling the server and the client. The method includes (a) receiving by the control point a UI event message from the 3rd party device not joined in the UI session, the UI event message representing change in a state of the 3rd party device, (b) selecting by the control point a target client for processing a UI event, (c) transmitting by the control point an Out-of-session connect action message (OOSConnect Action) requesting connection setup with the 3rd party device to the selected target client, and (d) transmitting by the target client a permission message for the OOSConnect Action to the control point, thereby setting an Out-of-session connection OOSConnect with the 3rd party device and processing the UI event.

13 Claims, 7 Drawing Sheets

U.S. PATENT DOCUMENTS

| | | | | |
|---|---|---|---|---|
| 6,618,764 | B1* | 9/2003 | Shteyn | 709/249 |
| 6,725,281 | B1* | 4/2004 | Zintel et al. | 719/318 |
| 6,772,201 | B2 | 8/2004 | Simmon et al. | |
| 6,917,976 | B1* | 7/2005 | Slaughter et al. | 709/226 |
| 6,970,869 | B1* | 11/2005 | Slaughter et al. | 707/10 |
| 7,130,925 | B2* | 10/2006 | Noda et al. | 709/249 |
| 2001/0033554 | A1* | 10/2001 | Ayyagari et al. | 370/328 |
| 2003/0187920 | A1 | 10/2003 | Redkar | |
| 2004/0078542 | A1* | 4/2004 | Fuller et al. | 711/172 |
| 2004/0260427 | A1 | 12/2004 | Wimsatt | |
| 2006/0080408 | A1* | 4/2006 | Istvan et al. | 709/219 |
| 2007/0203979 | A1* | 8/2007 | Walker et al. | 709/204 |
| 2007/0214241 | A1* | 9/2007 | Song et al. | 709/219 |

OTHER PUBLICATIONS

Walker, M. et al., "Remote I/O: Freeing the Experience from the Platform with UPnP Architecture", Intel Technology Journal, 2002, pp. 30-36, vol. 6, No. 4.

* cited by examiner

METHOD AND APPARATUS FOR OUTPUTTING A USER INTERFACE (UI) EVENT OF 3RD PARTY DEVICE IN HOME NETWORK

CROSS-REFERENCE TO RELATED APPLICATIONS

This application claims priority from Korean Patent Application No. 10-2006-0067635 filed on Jul. 19, 2006 in the Korean Intellectual Property Office, and U.S. Provisional Patent Application No. 60/721,117 filed on Sep. 28, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to event processing technology in a home network, and more particularly to outputting a user interface (UI) event of a 3rd party device in a home network, in which another device can process the UI event of the 3rd party device not belonging to a UI session in the home network.

2. Description of the Related Art

Generally, a home network includes an Internet Protocol (IP)-based private network, and forms a single network having various devices in a home such as all types of personal computers (PCs), intelligent products and radio devices through a common virtual computing environment referred to as middleware, and controls the devices.

Middleware interconnects various digital devices in a peer-to-peer manner and allows these devices to communicate with one another. Home AV Interoperability (HAVI), Universal Plug and Play (UPnP), Java Intelligent Network Infrastructure (Jini), Home Wide Web (HWW), etc., have been proposed as middleware up to now.

In a computing environment constructed through the UPnP middleware, each device receives an address allocated from a server according to a Dynamic Host Configuration Protocol (DHCP), or receives an address selected by an automatic IP designation function, and performs both communication among other devices and search/inquiry on a network through the received address.

A UPnP network, which is a home network having a high possibility of wide use in the near future, defines a UPnP device and a UPnP service, and defines protocols between the UPnP device and the UPnP service. A UPnP network includes both a Controlled Device (CD), a home network device connected to and controlled by an IP-based home network, and a Control Point (CP) which is a device for controlling the controlled device. The control point is a device for performing control for the controlled device, and is an element for requesting and receiving an event. The controlled device is a device for performing a predetermined function at the request of the control point, and is an element for sending the event to the control point having requested the event if the state of the controlled device is altered.

Hereinafter, a related art step-by-step process among UPnP network devices will be described. The process includes a discovery-advertisement process, a description process, a control process and an eventing process.

The discovery-advertisement process includes an advertisement process in which a new controlled device is connected to a home network and advertises the existence of the new controlled device to other devices on the home network, and a discovery process in which a new control point is connected to the home network and searches for controlled devices operating on the home network.

The description process is a process in which the control point parses a service description Extensible Markup Language (XML) file or a device description XML file through the IP address of the controlled device, which is obtained through the discovery-advertisement process, in order to control the controlled device, and recognizes the function of the newly added device in more detail.

The control process is a process in which, when the control point is to provide a specific service through a controlled device, the control point transmits an action request for requiring a predetermined service to the corresponding controlled device by means of a SOAP according to a UPnP device architecture, and receives a result or a variable value for the transmitted action request.

The eventing process is a process for checking the information change state of the controlled device having received the predetermined service according to a control command transmitted from the control point. This process will be described with reference to FIG. 1.

Referring to FIG. 1, it can be understood that the control point and the controlled device perform the eventing process in a one-to-one fashion. First, if the control point transmits a subscription request to the service of the controlled device in order to check the information change state of the controlled device, the service of the controlled device transmits an XML type event message formatted through a Generic Event Notification Architecture (GENA) to the control point in order to report the changed information. The control point receives the event message from the controlled device, and processes the event message as a description update item for the controlled device. If the control point is to continuously receive an event even when a subscription period has expired, the control point transmits a renewal request message to the service of the controlled device and requests the increase of the subscription period. Then, the service clearly defines a new subscription period and permits the subscription. However, if the control point is not to receive the event any more, the control point may cancel the subscription by transmitting an unsubscribe message to the service of the controlled device.

FIG. 2 is a diagram illustrating a related art eventing process proposed by a UPnP Remote User Interface (RUI). First, a control point 10 acquires protocol information from an RUI server 20 and an RUI client 30, which correspond to controlled devices (S11). Further, the control point 10 acquires all available UI information that can be provided from the RUI server 20 through the RUI client 30 (S12), and selects a proper UI to be outputted through the RUI client 30 (S13). Then, the control point 10 connects to the RUI client 30 and requests the output of the selected UI (S14), and the RUI client 30 having received the request forms an out-of-band protocol with the RUI server 20 and outputs the UI information (S 15).

Generally, if the state of a controlled device changes, the controlled device transmits an event message to a control point in order to report the state change. In the UPnP remote UI as described above, if the UI state of the RUI server 20 changes, the change of the UI state can be reported to the RUI client 30 only through a remote protocol between the RUI server 20 and the RUI client 30, in addition to the event defined in the UPnP protocol. That is, the report is possible only when a remote protocol session between the RUI server 20 and the RUI client 30 is in progress.

However, if a 3rd party device exists and is to report its own state, it is difficult to apply an existing remote UI method. Actually, a UPnP remote UI specification provides a DisplayMessage Action in order to overcome such a disadvantage, but the action is possible only when a device performing a CP function must be included in the RUI server 20. That is, the RUI server 20 performs the function of a controlled device of a UPnP, and the RUI server 20 must have the function of a UPnP CP in order to simply call the DisplayMessage Action. In such a case, it is inefficient in a device having insufficient resources, and unnecessary network traffic may occur due to the addition of the CP function.

SUMMARY OF THE INVENTION

An aspect of the present invention provides a method and an apparatus for outputting a UI event of a 3rd party device in a home network, in which the 3rd party device not joined in a remoteUI session can display its own UI by effectively informing other devices of its own state.

The present invention is not limited to that stated above. Those of ordinary skill in the art will clearly recognize additional aspects in view of the following description of the present invention.

In accordance with one aspect of the present invention, there is provided a method of outputting a UI event of a 3rd party device in a home network having a server, a client and a control point, the server and the client joining a UI session by using a remote protocol, the control point controlling the server and the client. The method includes (a) receiving by the control point a UI event message from the 3rd party device not joined in the UI session, the UI event message representing change in a state of the 3rd party device; (b) selecting by the control point a target client for processing a UI event; (c) transmitting by the control point an Out-of-session connect action message (OOSConnect Action) requesting connection setup with the 3rd party device to the selected target client; and (d) transmitting by the target client a permission message for the OOConnect Action to the control point, thereby setting an Out-of-session connection (OOSConnect) with the 3rd party device and processing the UI event.

In accordance with another aspect of the present invention, there is provided an apparatus for outputting a UI event of a 3rd party device in a home network having a server, a client, the 3rd party device and a control point, the server and the client joining a UI session by using a remote protocol, the 3rd party device not joined in the UI session, the control point controlling the server and the client. The apparatus includes the control point for receiving a UI event message from the 3rd party device, the UI event message representing change in a state of the 3rd party device; and a target client for processing a UI event, the target client being selected by the control point, in which, when the control point transmits an OOSConnect Action requesting connection setup with the 3rd party device to the selected target client, the target client transmits a permission message for the OOSConnect Action to the control point, thereby setting an OOSConnect with the 3rd party device and processing the UI event.

BRIEF DESCRIPTION OF THE DRAWINGS

The above and other features of the present invention will be more apparent from the following detailed description taken in conjunction with the accompanying drawings, in which.

DETAILED DESCRIPTION OF THE EXEMPLARY EMBODIMENTS

Figure 1:
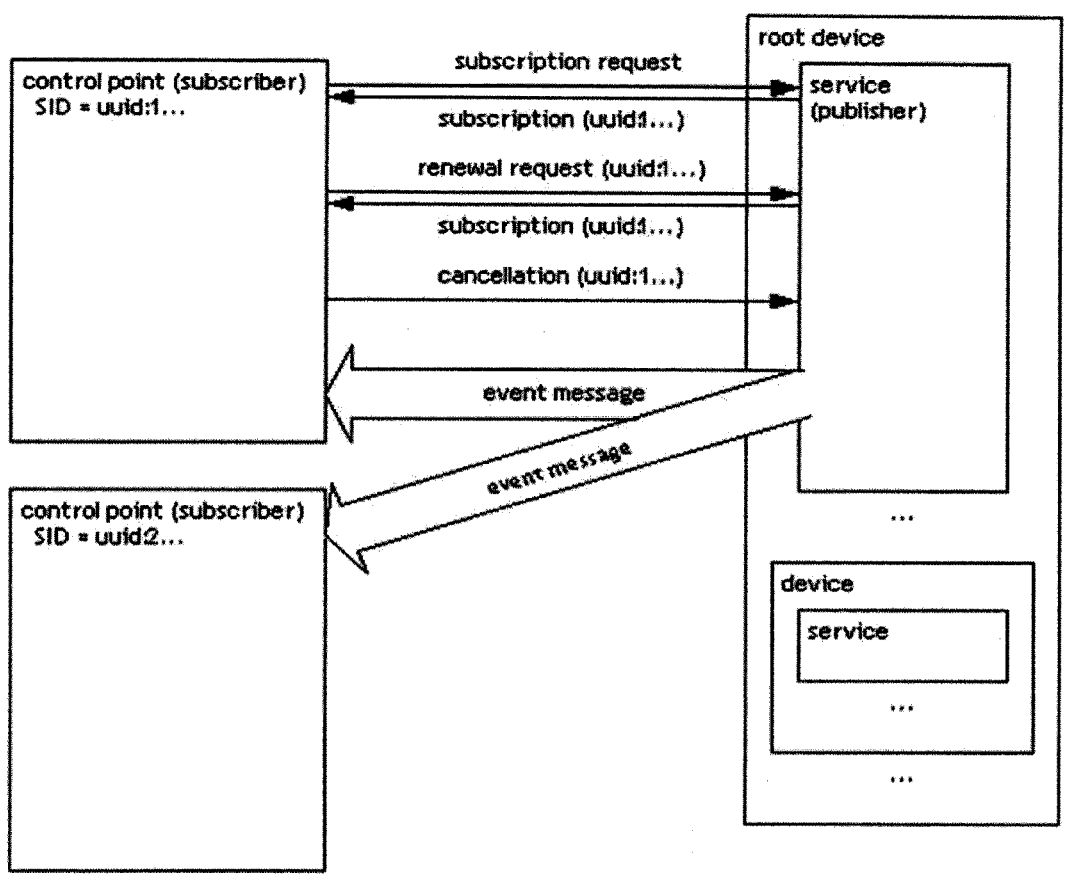
FIG. 1 is a diagram illustrating an eventing process in a UPnP according to the related art.
Figure 2:
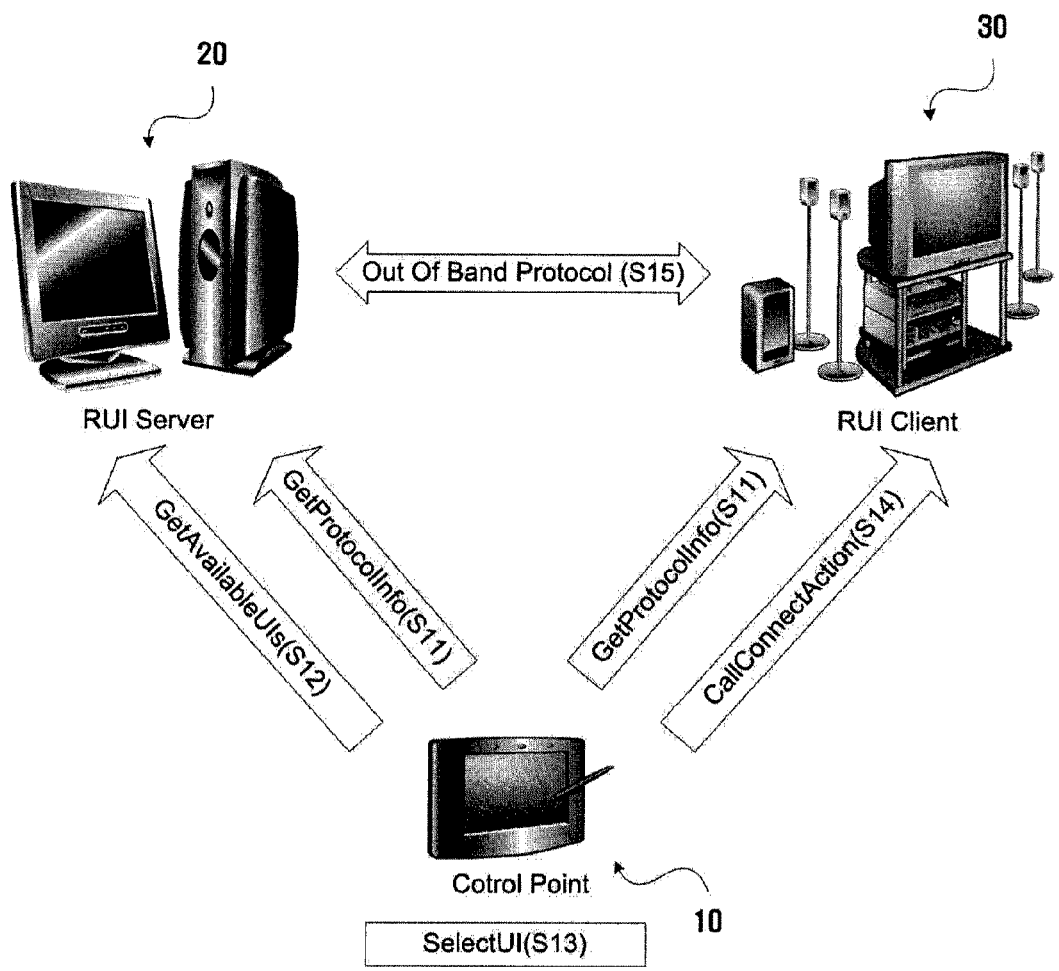
FIG. 2 is a diagram illustrating the construction of a UPnP remote UI system according to the related art.

Detailed particulars of additional exemplary embodiments are included in detailed description and drawings.

Features of the present invention will be apparent from exemplary embodiments of the present invention as described below together with the accompanying drawings. However, the scope of the present invention is not limited to such exemplary embodiments and may be realized in various forms. The exemplary embodiments described below are only provided to assist those skilled in the art to understand the present invention. The present invention is defined by the scope of the appended claims. Also, the same reference numerals are used to designate the same elements throughout the specification.

Hereinafter, a method and an apparatus for outputting a UI event of a 3rd party device in a home network according to a exemplary embodiment of the present invention will be described with reference to the accompanying drawings.

In an exemplary embodiment of the present invention, a UPnP RUI system corresponding to an application of a UPnP will be described, and devices for embodying the present invention will use the names of devices defined in the UPnP RUI specification. That is, a control point, a server of a controlled device, a client of the controlled device, and a third device will be referred to as an RUI-CP, an RUI Server (RUIS), an RUI Client (RUIC) and a 3rd party device, respectively. However, it is apparent to those skilled in the art that the claim of the present invention is not affected by the home network system and the names of devices.

Figure 3:
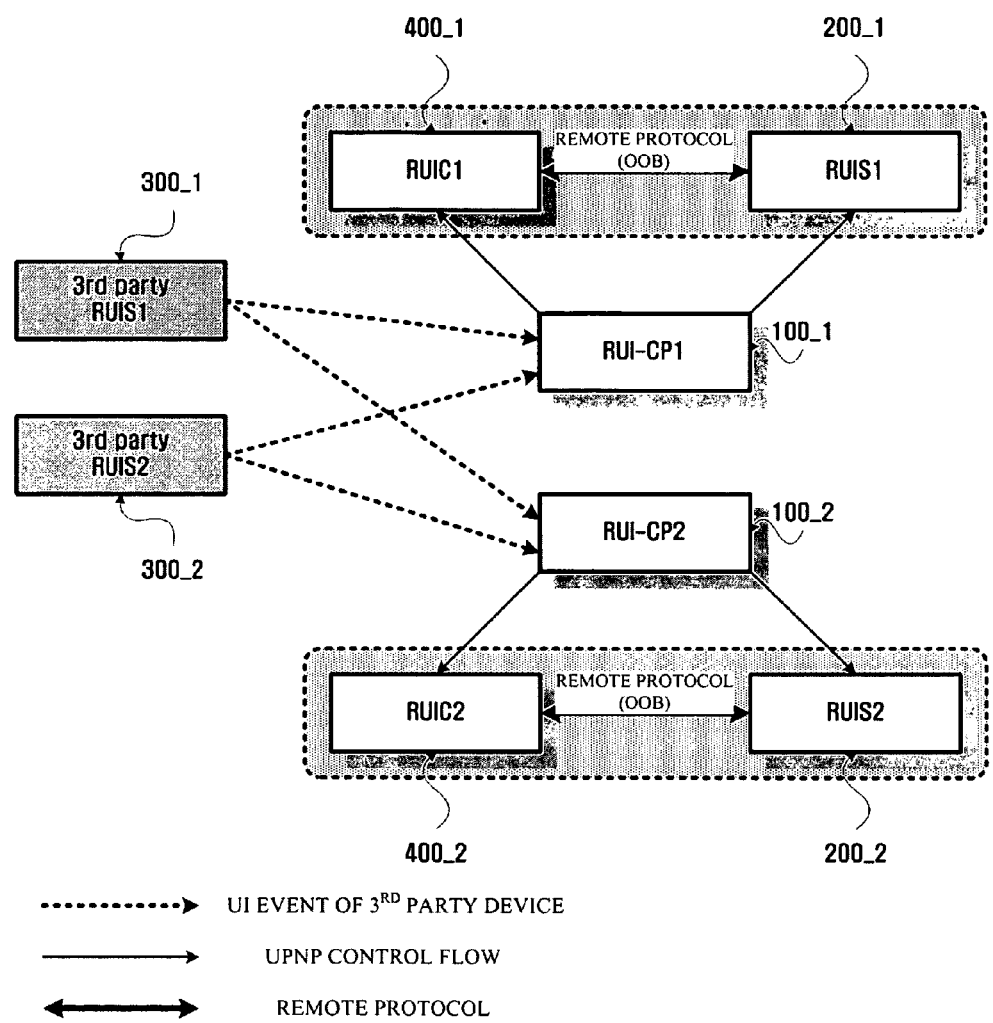
FIG. 3 is a block diagram illustrating an apparatus for outputting a UI event of a 3rd party device according to one exemplary embodiment of the present invention.

FIG. 3 is a block diagram illustrating the apparatus for outputting a UI event of a 3rd party device according to one exemplary embodiment of the present invention.

Referring to FIG. 3, a set of an RUIS1 200_1 an RUIC 1 400_1 and a set of an RUIS2 200_2-an RUIC2 400_2, which join a UI session by means of a remote protocol, exist in a UPnP RUI system, and an RUI-CP1 100_1 and an RUI-CP2 100_2, which correspond to control points, control the two sets, respectively. Further, a 3rd party RUIS1 300_1 and a 3rd party RUIS2 300_2 exist, so that a home network is formed, wherein the 3rd party RUIS1 300_1 and the 3rd party RUIS2

300_2 do not join the UI session, but can generate a UI event under the control of the RUI-CP1 100_1 and the RUI-CP2 100_2.

In FIG. 3, the RUIS1 200_1 and the RUIS2 200_2, which correspond to servers as controlled devices, may be devices for generating a UI event like desktop PCs or telephones. The RUIC1 400_1 and the RUIC2 400_2, which correspond to clients as other controlled devices, may be PCs in another location, which are remotely controlled by the desktop PC, or digital TVs capable of displaying an event reporting that a telephone is ringing. The remote protocol may be referred to as a rule for causing the RUIS and the RUIC to join a session so that the RUIC can display the UI event of the RUIS. For example, the remote protocol may include a Remote Desktop Protocol (RDP), an HTTP, an XHT, etc.

Hereinafter, the method for outputting a UI event of a 3rd party device in a home network according to the present invention will be described with reference to FIGS. 4 to 8.

Figure 4:
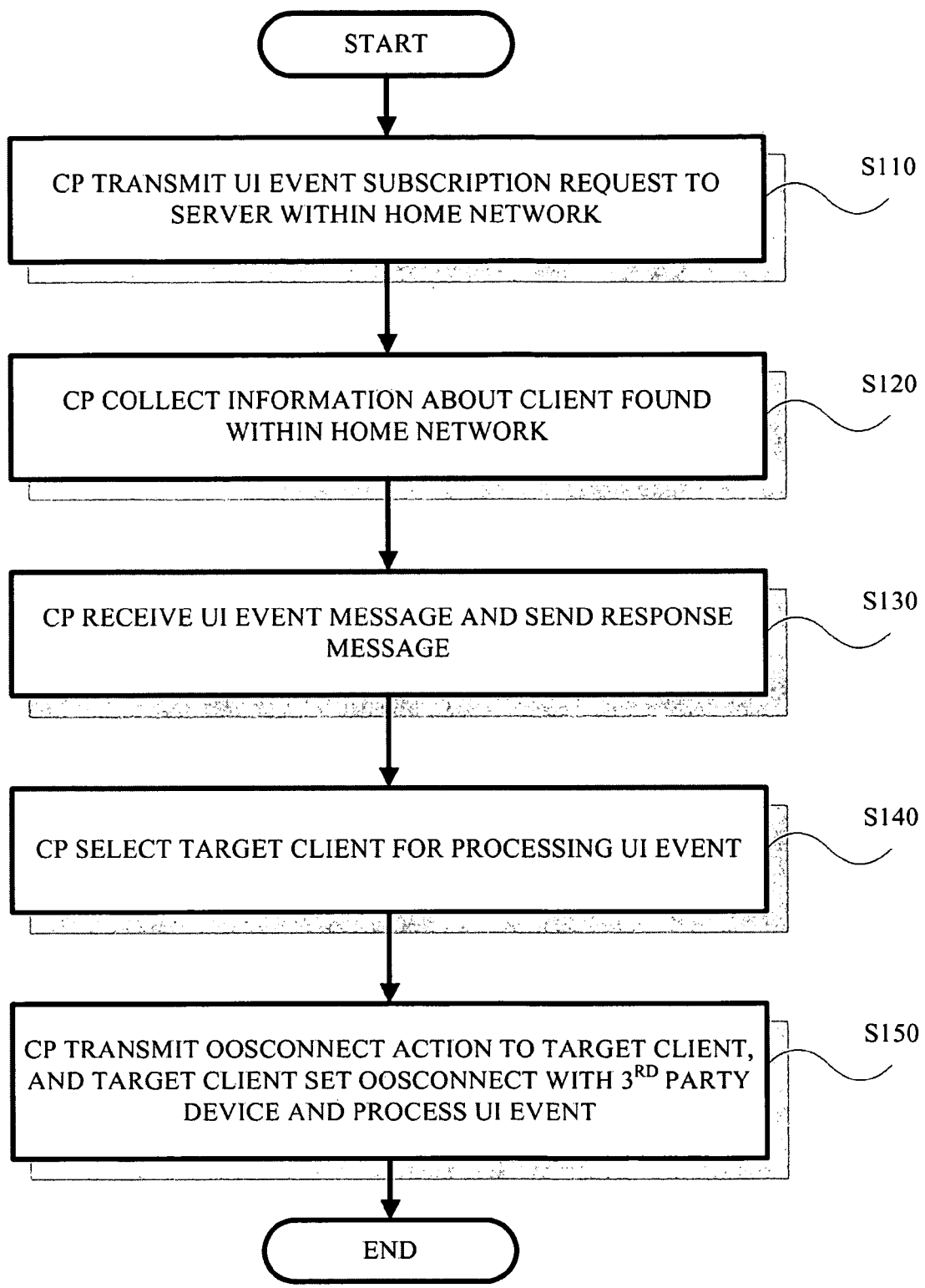
FIG. 4 is a flow diagram illustrating a method for outputting a UI event of a 3rd party device according to one exemplary embodiment of the present invention.

FIG. 4 is a flow diagram illustrating the method for outputting a UI event of a 3rd party device according to one exemplary embodiment of the present invention.

First, the RUI-CP 100 transmits a UI event subscription request to a server found within the home network (S110). This step will be described in detail with reference to FIG. 5 illustrating a process in which the RUI-CP transmits an event subscription request to the server device.

Figure 5:
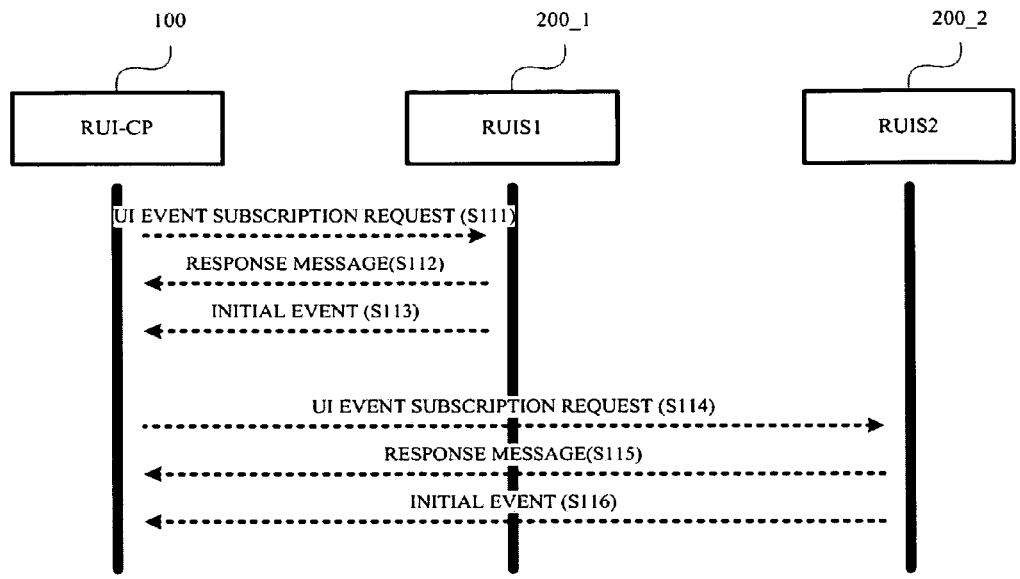
FIG. 5 is a ladder diagram illustrating a process in which a control point transmits an event subscription request to a server device according to one exemplary embodiment of the present invention.

Referring to FIG. 5, the RUI-CP 100 transmits a UI event subscription request to the RUIS1 200_1 (S111), and the RUIS1 200_1 transmits both a response message for the UI event subscription request and an initial event message (S112 and S113). Further, the RUI-CP 100 repeats these steps for the RUIS2 200_2 that is another client device (S114, S115 and S116).

After receiving the response message and the initial event message, the RUI-CP 100 collects information about client devices found within the home network (S120). This step will be described in detail with reference to FIG. 6 illustrating a process in which the RUI-CP 100 collects information about the client device according to one exemplary embodiment of the present invention.

Figure 6:
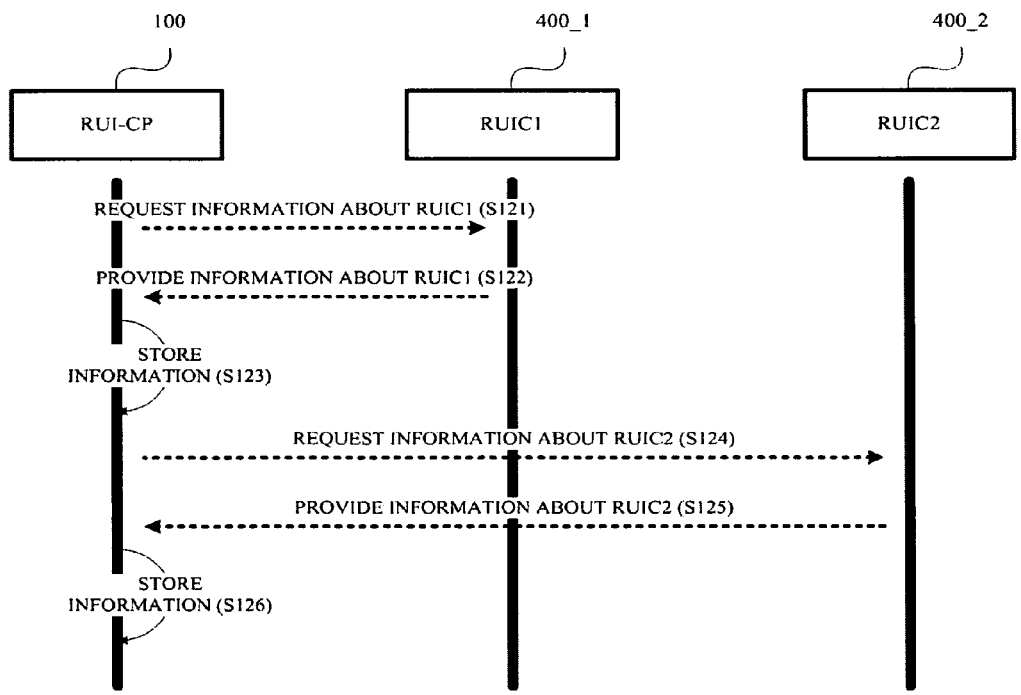
FIG. 6 is a ladder diagram illustrating a process in which a control point collects information about a client device according to one exemplary embodiment of the present invention.

Referring to FIG. 6, the RUI-CP 100 requests the RUIC1 400_1 to provide information of the RUIC1 400_1 (S121), and the RUIC1 400_1 provides the RUI-CP 100 with its own information in response to the received request (S122). The RUI-CP 100 stores the received information (S123). Further, since the RUI-CP 100 repeats these steps for the RUIC2 400_2 (S124, S125 and S126), details will be omitted. In the process of FIG. 6, the information about the client devices includes both information about remote protocols supported by the client devices and Out-of-session Cap Info (OOS-CapaInfo) representing whether a UI event generated by the 3rd party device can be processed.

In a state in which the RUI-CP 100 has the information about the client devices (controlled devices), the 3rd party device not joined in the session generates a UI event message representing a change in its own state. Then, the RUI-CP 100 receives the UI event message generated by the 3rd party device, and sends a response message for the received UI event message (S130). This step will be described in detail with reference to FIG. 7.

Figure 7:
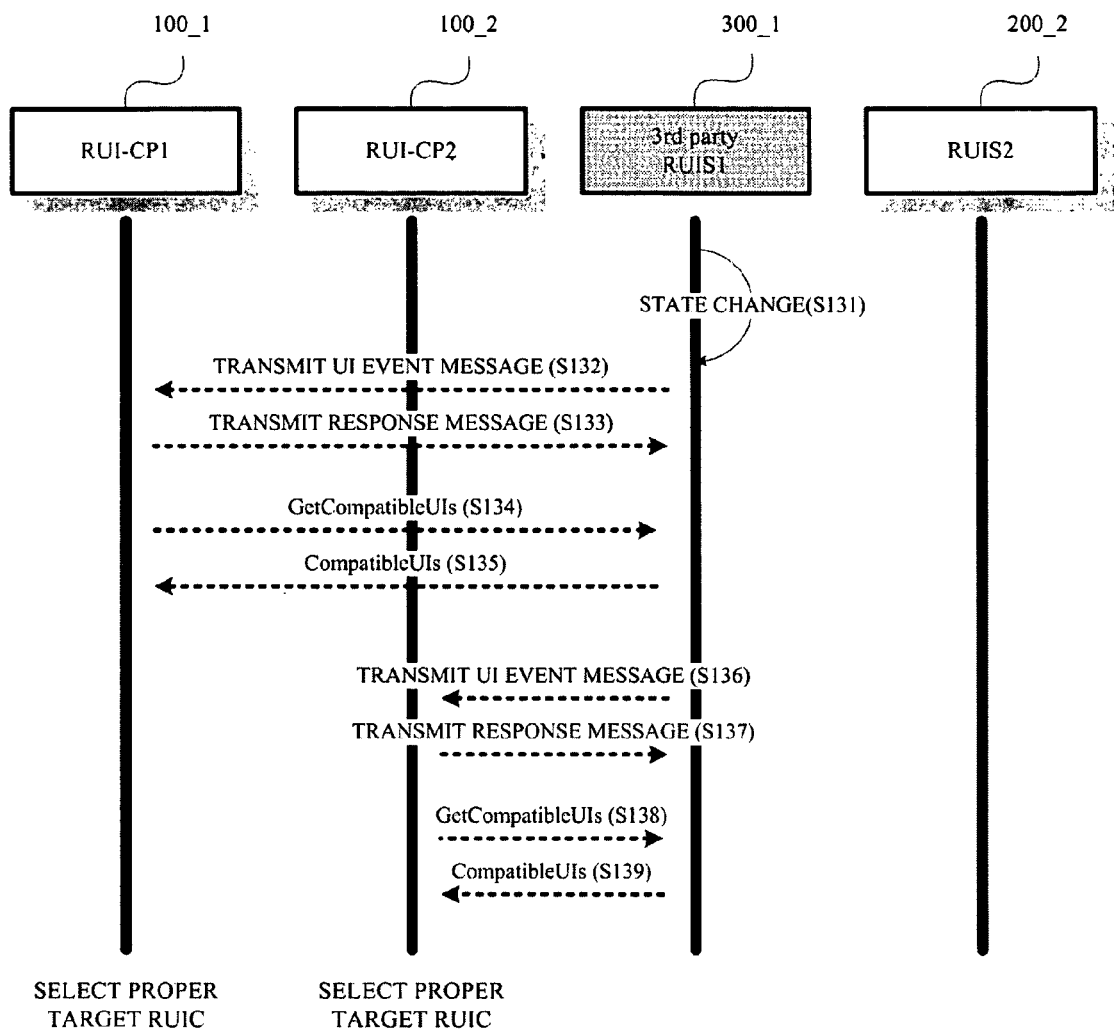
FIG. 7 is a ladder diagram illustrating a process in which a control point receives a UI event message from a 3rd party device, and selects a target client that will process a UI event.

FIG. 7 is a ladder diagram illustrating a process in which the RUI-CP receives the UI event message from the 3rd party device, and selects a target client that will process the UI event.

When the 3rd party RUIS1 300_1 corresponding to another server device, which does not join the UI session between the RUIS 200 (e.g., RUIS1 200_1) and the RUIC 400 (e.g., RUIS1 400_1), changes its own state at a certain time point (S131), the 3rd party RUIS1 300_1 generates an event message reporting a change in the state and transmits the event message to the RUI-CP1 100_1 (S132). After receiving the event message, the RUI-CP1 100_1 transmits a response message to the 3rd party RUIS1 300_1 (S133). For example, an electrical device which uses a type of gas could be the 3rd party RUIS1 300_1. In a case in which an event occurs representing the opening of a gas valve of the electrical device, the 3rd party RUIS1 300_1 transmits an event message reporting the opening of the gas valve to the RUI-CP1 100_1 in order to quickly inform a user of this situation.

The RUI-CP1 100_1 requests a GetCompatibleUIs Action in order to obtain information about a remote protocol supported by the 3rd party RUIS1 300_1 (S134). Then, the 3rd party RUIS1 300_1 provides the CompatibleUIs Action in response to the received request, thereby providing the RUI-CP1 100_1 with the information about the remote protocol (S135). The 3rd party RUIS1 300_1 stores the received information, and uses the stored information in order to select a client capable of processing the UI event of the 3rd party RUIS1 300_1 in step S140 that will be described later.

Further, the RUI-CP 100_2 corresponding to another RUI-CP may also receive the UI event message regarding the change in the state of the 3rd party RUIS1 300_1. In such a case, the same steps as steps 132 to 135 are performed between the RUI-CP2 100_2 and the 3rd party RUIS1 300_1 (steps 136 to 139). Herein, the UI event message generated by the 3rd party RUIS1 300_1 must be transmitted only to the RUI-CP having requested the UI event subscription in step 110. This is because the 3rd party RUIS1 300_1 does not have the necessity of reporting the change in its own state to a RUI-CP having not requested the UI event subscription.

The UI event message includes both Unique Device Name (UDN) information of the 3rd party RUIS1 300_1 and UI event sequence information representing the sequence of multiple UI events generated by the 3rd party RUIS1 300_1. The event sequence information increases by one whenever the state of the 3rd party RUIS1 300_1 changes, and thus, the UI event occurs. When two or more 3rd party RUISs transmit the UI event message, the UDN information is used for identifying the 3rd party RUISs. Further, when one 3rd party RUIS consecutively generates and transmits a UI event to the RUI-CPs 100, if the RUI-CPs 100 request one RUIC 400 (e.g., RUIC1 400_1) to process the UI event, it is possible for the RUIC 400 to repeatedly process the same UI event. The event sequence information prevents such a possibility.

The RUI-CP having performed the process of FIG. 7 selects one or more clients having conditions suitable for processing the UI event by using the OOSCapaInfo (information representing whether the UI event generated by the 3rd party device can be processed) collected and stored in step 120. Herein, the OOSCapaInfo may include information about three situations: information representing that the UI event can always be processed; information representing that the UI event can be processed only when the client is joining the remote UI session; and information representing that the UI event cannot always be processed. Such classification into the three types of information is only one exemplary embodiment. That is, the OOSCapaInfo may further include information about many situations.

Then, the RUI-CP 100 selects a client (target client) capable of processing the UI event from said one or more selected clients (S140). Herein, the RUI-CP 100 compares the remote protocol information of the information about the clients collected in step 120 with the information about the remote protocol supported by the 3rd party RUIS 300_1, and selects a matched client as the final target client.

The RUI-CP transmits an Out-of-session Connect Action (OOSConnect Action) requesting connection setup with the 3rd party device to the target client selected through the afore-described process in order to allow the target client to process the UI event message generated by the 3rd party (S150). This step will be described in detail with reference to FIG. 8 illustrating a process in which the RUI-CP transmits the OOSConnect Action to the target client according to one exemplary embodiment of the present invention.

Figure 8:
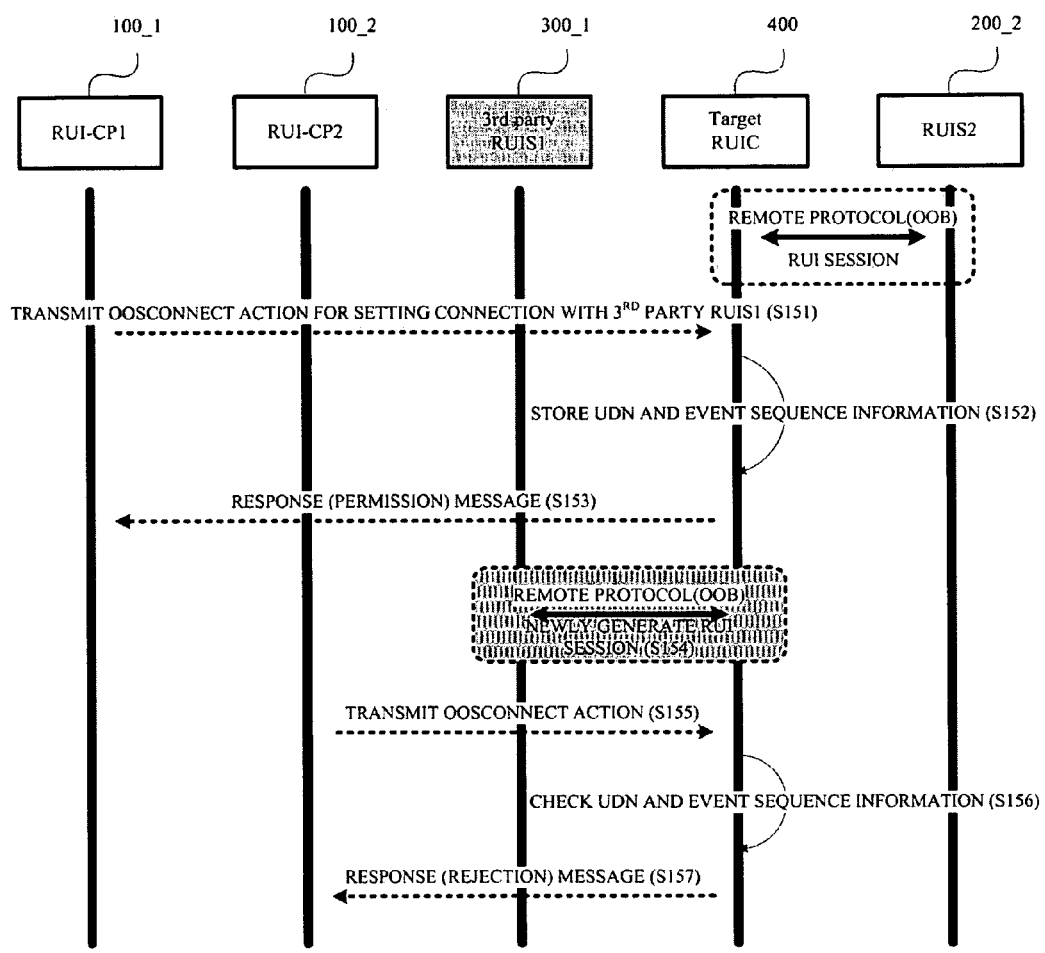
FIG. 8 is a ladder diagram illustrating a process in which a control point transmits an OOSConnect Action to a target client according to one exemplary embodiment of the present invention.

Referring to FIG. 8, it can be understood that the target RUIC 400 corresponding to the target client has previously joined the RUI session by means of the remote protocol (out-of-band protocol) together with the RUIS2 200_2. The selected target RUIC 400 may set a new out-of-session connection even when running a RemoteUI session with the RUIS2 200_2 corresponding to another server. This will now be described.

The RUI-CP1 100_1 inserts both the UDN information of the 3rd party RUIS1 300_1 and the UI event sequence information into the OOSConnect Action, and transmits the OOSConnect Action to the selected target RUIC 400 (S151). The target RUIC 400 receives the OOSConnect Action and stores the UDN information and the UI event sequence information (S152). The reason for storing the received information is for preventing the RUIC 400 from repeatedly processing the UI event according to the OOSConnect Action for processing of the UI event from the RUI-CP2 100_2 corresponding to another RUI-CP having received the same UI event from the 3rd party RUIS1 300_1.

Accordingly, the target RUIC 400, which has initially performed the OOSConnect for the one UI event transmitted from the 3rd party RUIS1 300_1, compares the UDN information with the UI event sequence information in order to determine if the RUI-CP2 100_2 has transmitted the same OOSConnect Action. As a result of the comparison, when the UDN information does not coincide with the UI event sequence information, the target RUIC 400 transmits a response (permission) message to the RUI-CP1 100_1 (S153), and forms a new RUI session with the 3rd party RUIS1 300_1 (S154).

If the target RUIC 400 has received the second OOSConnect Action with the same content from the RUI-CP2 100_2 (S155), the target RUIC 400 compares UDN information, and UI event sequence information, which are included in the second OOSConnect Action, with the UDN information and the UI event sequence information stored in step 152, (S156).

As a result of the comparison, when the received UDN information and UI event sequence information coincide with the stored UDN information and UI event sequence information, the target RUIC 400 transmits a message, which represents that the UI event has been previously processed, to the RUI-CP2 100_2. The reason that the received UDN information and UI event sequence information coincide with the stored UDN information and UI event sequence information is because the target RUIC 400 has received the OOSConnect Action for the same UI event and then processed the UI event of the 3rd party RUIS1 300_1. Accordingly, the target RUIC 400 transfers a message representing that the UI event has been processed to the RUI-CP2 100_2 while transmitting a rejection message to the RUI-CP2 100_2 (S157).

It is apparent to those skilled in the art that the scope of protection of the apparatus for outputting a UI event of a 3rd party device in a home network according to an exemplary embodiment of the present invention covers a computer-readable recording medium recording program codes for executing the method as described above.

According to the present invention as described above, a 3rd party device not joined in a remoteUI session can display its own UI by effectively informing other devices of its own state, so that the present invention can be variously and efficiently applied to intelligent home appliances.

Although a exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of outputting a user interface (UI) event of a 3rd party device in a home network comprising a server, a client and a control point, wherein the server and the client are joined in a UI session using a remote protocol, and the control point controls the server and the client, the method comprising:
   (a1) transmitting, by the control point, a UI event subscription request to the server within the home network, and receiving both a response message and an initial event message for the transmitted request;
   (a2) collecting, by the control point, information about the client within the home network;
   (a3) receiving, by the control point, a UI event message from the 3rd party device not joined in the UI session, wherein the UI event message represents a change in a state of the 3rd party device;
   transmitting a response message in response to reception of the UI event message,
   comparing, by the control point, the information about the remote protocol of the information about the client collected in (a2) with a remote protocol supported by the 3rd party device, so that the target client is selected;
   (b) selecting, by the control point, a target client for processing a UI event of the received UI event message based on Out-of-session connection information provided by the target client;
   (c) transmitting, by the control point, an Out-of-session connect action message (OOSConnect Action) requesting connection setup with the 3rd party device to the selected target client;
   (d) transmitting, by the target client, a permission message for the OOSConnect Action to the control point, thereby setting an Out-of-session connection (OOSConnect) with the 3rd party device; and
   processing the UI event,
   wherein the information about the client in (a2) comprises both information about a remote protocol supported by the client and Out-of-session Cap Info (OOSCapaInfo) representing whether the UI event generated by the 3rd party device can be processed.

2. The method of claim 1, wherein the UI event message is transmitted only to a control point having transmitted the UI event subscription request in (a1).

3. The method of claim 1, wherein the UI event message comprises both Unique Device Name (UDN) information of the 3rd party device and UI event sequence information representing a sequence of multiple UI events generated by the 3rd party device, and the UI event sequence information increases by one whenever the state of the 3rd party device changes and thus the UI event occurs.

4. The method of claim 3, wherein (c) comprises:
   (c1) inserting both the UDN information of the 3rd party device and the UI event sequence information into the OOSConnect Action, and transmitting the OOSConnect Action to the selected target client; and (c2) storing the received UDN information and UI event sequence information.

5. The method of claim 4, wherein, when the target client receives a second OOSConnect Action from a second control point having received the UI event message, (d) comprises:

(d1) comparing UDN information and UI event sequence information, which are stored in the second OOSConnect Action, with the UDN information and the UI event sequence information stored in (c2); and (d2) if the received UDN information and UI event sequence information coincide with the stored UDN information and UI event sequence information, transmitting a message representing that the UI event has been previously processed to the second control point, and if the received UDN information and UI event sequence information do not coincide with the stored UDN information and UI event sequence information, transmitting the permission message to the second control point, thereby setting an OOSConnect with the 3rd party device and processing the UI event.

6. The method of claim 1, wherein the OOSCapaInfo comprises information representing that the UI event can always be processed, information representing that the UI event can be processed only when the client joins the remote UI session, and information representing that the UI event cannot always be processed.

7. A non-transitory computer-readable recording medium recording program codes for executing the method of claim 1.

8. An apparatus for outputting a user interface (UI) event of a 3rd party device in a home network including a server, a client, the 3rd party device and a control point, wherein the server and the client are joined in a UI session using a remote protocol, the 3rd party device not joined in the UI session, the control point controlling the server and the client, the apparatus comprising:

the control point which transmits a UI event subscription request to the server within the home network, receives both a response message and an initial event message for the transmitted request, collects information about the client, and receives a UI event message from the 3rd party device, the UI event message representing a change in a state of the 3rd party device; and the control point compares the information about the remote protocol of the collected information about the client with a remote protocol supported by the 3rd party device, thereby selecting the target client; and a target client which processes a UI event, wherein the target client has been selected by the control point based on Out-of-session connection information provided by the target client, the control point transmits an Out-of-session connect action (OOSConnect Action) requesting connection setup with the 3rd party device to the selected target client, the target client transmits a permission message for the OOSConnect Action to the control point, thereby setting an Out-of-session connection (OOSConnect) with the 3rd party device and processing the UI event, wherein the information about the client comprises both information about a remote protocol supported by the client and Out-of-session Cap Info (OOSCapaInfo) representing whether the UI event generated by the 3rd party device can be processed.

9. The apparatus of claim 8, wherein the UI event message is transmitted only to a control point having transmitted the UI event subscription request.

10. The apparatus of claim 8, wherein the UI event message comprises both Unique Device Name (UDN) information of the 3rd party device and UI event sequence information representing a sequence of multiple UI events generated by the 3rd party device, and the UI event sequence information increases by one whenever the state of the 3rd party device changes and thus the UI event occurs.

11. The apparatus of claim 10, wherein the control point inserts both the UDN information of the 3rd party device and the UI event sequence information into the OOSConnect Action, transmits the OOSConnect Action to the selected target client, and the target client stores the received UDN information and UI event sequence information.

12. The apparatus of claim 11, wherein, when the target client receives a second OOSConnect Action from a second control point having received the UI event message, the target client compares UDN information and UI event sequence information, which are stored in the second OOSConnect Action, with the stored UDN information and UI event sequence information, transmits a message representing that the UI event has been previously processed to the second control point if the received UDN information and UI event sequence information coincide with the stored UDN information and UI event sequence information, and transmits the permission message to the second control point if the received UDN information and UI event sequence information do not coincide with the stored UDN information and UI event sequence information, thereby setting an OOSConnect with the 3rd party device and processing the UI event.

13. The apparatus of claim 8, wherein the OOSCapaInfo comprises information representing that the UI event can always be processed, information representing that the UI event can be processed only when the client is joining the remote UI session, and information representing that the UI event cannot always be processed.

* * * * *